HARRIS & CLEGHORN.
Wheel-Cultivator.
No. 5,257. Patented Aug. 21, 1847.
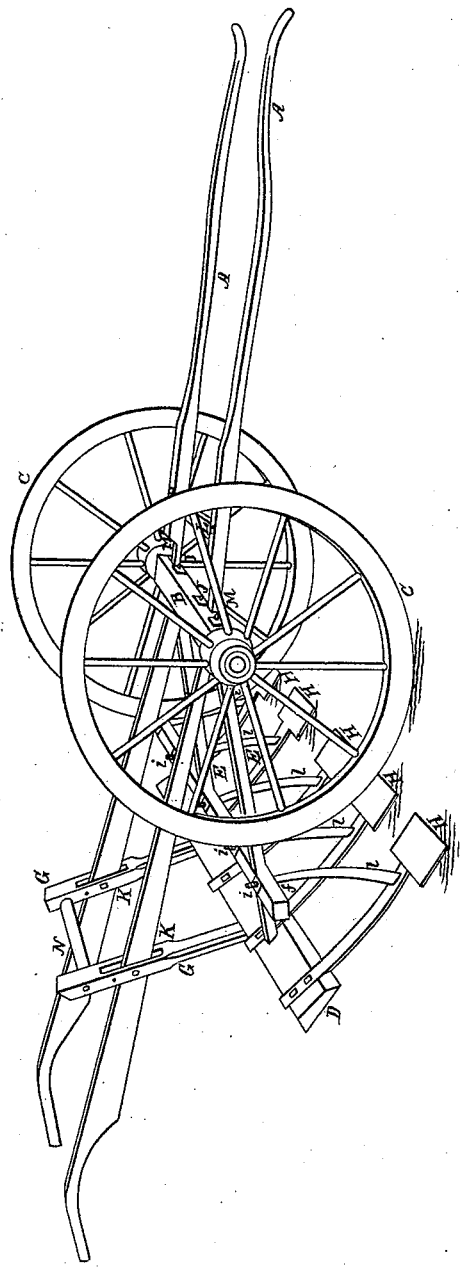

UNITED STATES PATENT OFFICE.

ELIJAH M. HARRIS AND JAMES CLEGHORN, OF CARTERSVILLE, GEORGIA.

IMPROVEMENT IN COTTON-THINNERS.

Specification forming part of Letters Patent No. 5,257, dated August 21, 1847.

*To all whom it may concern:*

Be it known that we, ELIJAH M. HARRIS and JAMES CLEGHORN, of Cartersville, in the county of Cass and State of Georgia, have invented a new and improved mode of executing the work usually termed by agriculturalists the "thinning of cotton;" and we do hereby declare that the following is a full and exact description of the same.

The nature of our invention consists in the application of an axle-tree and wheels to the thinning of cotton.

To enable others skilled in the art to make and use our invention, we will proceed to describe its construction and operation.

We construct our instrument for thinning cotton by making a pair of shafts eight feet long, which is shown at A A in the accompanying drawing; one wooden cross-bar connecting the shafts near the axle-tree, with an iron single-tree attached, as shown at L; one axle-tree five feet three inches long from point to point, which is shown at B; two wheels two feet in diameter, having hubs seven and one-half inches long, which are shown at C C; one beam, D, five feet long, five inches wide, two inches thick on the upper edge, and one and one-half inch thick on the lower edge, for the attachment of hoes; two arms, E, passing through the above beam at an angle of about fifteen degrees, so as to give the hoes a proper slope. These arms should pass loosely through the beam ten inches from each end, and attaching to the axle-tree twelve and one-half inches from each point with hinge-bolts and screws, as shown at M. These arms should be two feet six inches long, two and one-half by two inches square at the front end, and at the hinder end, where they pass through the beam, one and one-half inch thick and two and one-half inches wide. One front beam, $f$, five feet long, two by two and one-half inches square, passing across the arms parallel with the hinder beam and twelve inches therefrom, confined to each arm with a screw. The rods which attach to the hoes pass through the above beam, with screws and nuts on the upper side. Two uprights, G, twenty inches long, three and one-half inches wide, two inches thick, with a mortise six inches long, commencing nine inches above the beam, of sufficient size for the handles to pass through. These uprights are inserted by tenons into mortises in the hinder beam eighteen inches from each end, as shown in the drawing. One wooden cross-bar connecting the uprights at top, as shown at N; five iron hoes three inches long, eight inches wide, three-eighths of an inch thick, and perfectly sharp, having each a bar or stem twelve inches long, one and one-half inch wide, one-half inch thick, each stem or bar having a slight bend near the hoe. These hoes are attached to the hinder beam by two small bolts and screws, leaving a distance between the hoes of four inches, as shown at H H H H H. Five iron rods one-half inch thick, one inch wide, sixteen inches long, attached severally to the stem of each hoe one inch from the upper edge of the hoe, and passing through the front beam before described, as shown at I I I I; two handles, K, five feet long, one inch thick, two and one-half inches wide at the widest part, passing through the mortises in the uprights, and being attached each to the axle-tree by a hinge-bolt and a screw twenty-one inches from the points of the axle-trees, and to the uprights by a bolt and screw through each, as shown at J J.

To operate on very rich soil the machine should be constructed with three hoes, as above described, seventeen inches wide, and with a space between the hoes of four and one-half inches.

The instrument or machine thus constructed is to be drawn by a horse or mule at right angles across the drills. The hoes should be unchoked or cleaned by raising it by the handles as it is passing between the drills.

What we claim as our invention, and desire to secure by Letters Patent, is—

The combination of the handles with the axle and hoe frame, as described, the handles and hoe-frame being independently attached to the axle, which forms the fulcrum, and the relative position of the handles and hoe-frame being adjustable, the handles are converted into adjustable levers for elevating and depressing the hoes.

ELIJAH M. HARRIS.
JAMES CLEGHORN.

Witnesses:
JOHN C. McHALY,
E. C. HARRIS.